United States Patent
Schmaling et al.

(10) Patent No.: US 6,695,583 B2
(45) Date of Patent: Feb. 24, 2004

(54) SNUBBER-VIBRATION DAMPER SYSTEM FOR A BEARINGLESS MAIN ROTOR

(75) Inventors: David N. Schmaling, Southbury, CT (US); Robert Milne, Litchfield, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 48 days.

(21) Appl. No.: 10/159,391

(22) Filed: May 30, 2002

(65) Prior Publication Data

US 2003/0223871 A1 Dec. 4, 2003

(51) Int. Cl.$^7$ ............................. B64C 27/35
(52) U.S. Cl. ................. 416/107; 416/134 A; 416/140; 267/141.1
(58) Field of Search ................ 416/103, 104, 416/106, 107, 134 A, 140; 267/141, 141.1, 153, 294

(56) References Cited

U.S. PATENT DOCUMENTS

| | | |
|---|---|---|
| 3,761,199 A | 9/1973 | Ferris et al. |
| 4,235,570 A | 11/1980 | Ferris et al. |
| 4,244,677 A * | 1/1981 | Noehren et al. .......... 416/134 A |
| 4,568,245 A | 2/1986 | Hibyan et al. |
| 4,797,064 A | 1/1989 | Ferris et al. |
| 4,893,988 A | 1/1990 | Sato |
| 4,930,983 A | 6/1990 | Byrnes et al. |
| 5,092,738 A | 3/1992 | Byrnes et al. |
| 5,110,259 A * | 5/1992 | Robinson ................ 416/134 A |
| 5,120,195 A | 6/1992 | Schmaling et al. |
| 5,188,513 A * | 2/1993 | Byrnes .................... 416/134 A |
| 5,228,834 A * | 7/1993 | Yamamoto et al. ...... 416/134 A |
| 5,242,267 A | 9/1993 | Byrnes et al. |
| 5,286,167 A | 2/1994 | Byrnes et al. |
| 5,372,479 A | 12/1994 | Byrnes et al. |
| 5,400,878 A | 3/1995 | D'Anna et al. |
| 5,431,538 A | 7/1995 | Schmaling et al. |
| 5,460,487 A | 10/1995 | Schmaling et al. |
| 5,499,903 A | 3/1996 | Schmaling et al. |
| 5,601,408 A | 2/1997 | Hunter et al. |
| 5,690,474 A | 11/1997 | Byrnes et al. |
| 5,738,494 A | 4/1998 | Schmaling |
| 5,913,659 A | 6/1999 | Doolin et al. |
| 6,050,778 A | 4/2000 | McArdle et al. |
| 6,092,795 A | 7/2000 | McGuire |
| 6,126,398 A | 10/2000 | Bauer et al. |
| 6,196,800 B1 | 3/2001 | Bauer et al. |

* cited by examiner

*Primary Examiner*—Edward K. Look
*Assistant Examiner*—Richard A. Edgar
(74) *Attorney, Agent, or Firm*—Carlson, Gaskey & Olds

(57) ABSTRACT

A flexbeam rotor system includes an intermediate tube and a torque tube that envelopes a flexbeam in spaced relation thereto. The torque tube is connected to the flexbeam at its radially outer end and articulately connected to the intermediate tube through a snubber-vibration damper system. The torque tube is connected with an aerodynamic rotor blade member. The snubber vibration damper system includes a snubber bearing and an independent lead/lag bearing. The snubber bearing is located between the flexbeam and the intermediate tube along a pitch change axis. A lead/lag bearing is mounted between the intermediate tube and the torque tube on both the leading and trailing portion of blade assembly. Pitch/lag coupling complications are minimized as lead/lag motion takes place between the torque tube and the intermediate tube. As lead/lag motion is accommodated in the independent lead/lag bearing, the snubber bearing is of a greatly reduced height in relation to conventional design. The overall size of the torque tube is accordingly reduced which advantageously reduces system weight and drag.

25 Claims, 4 Drawing Sheets

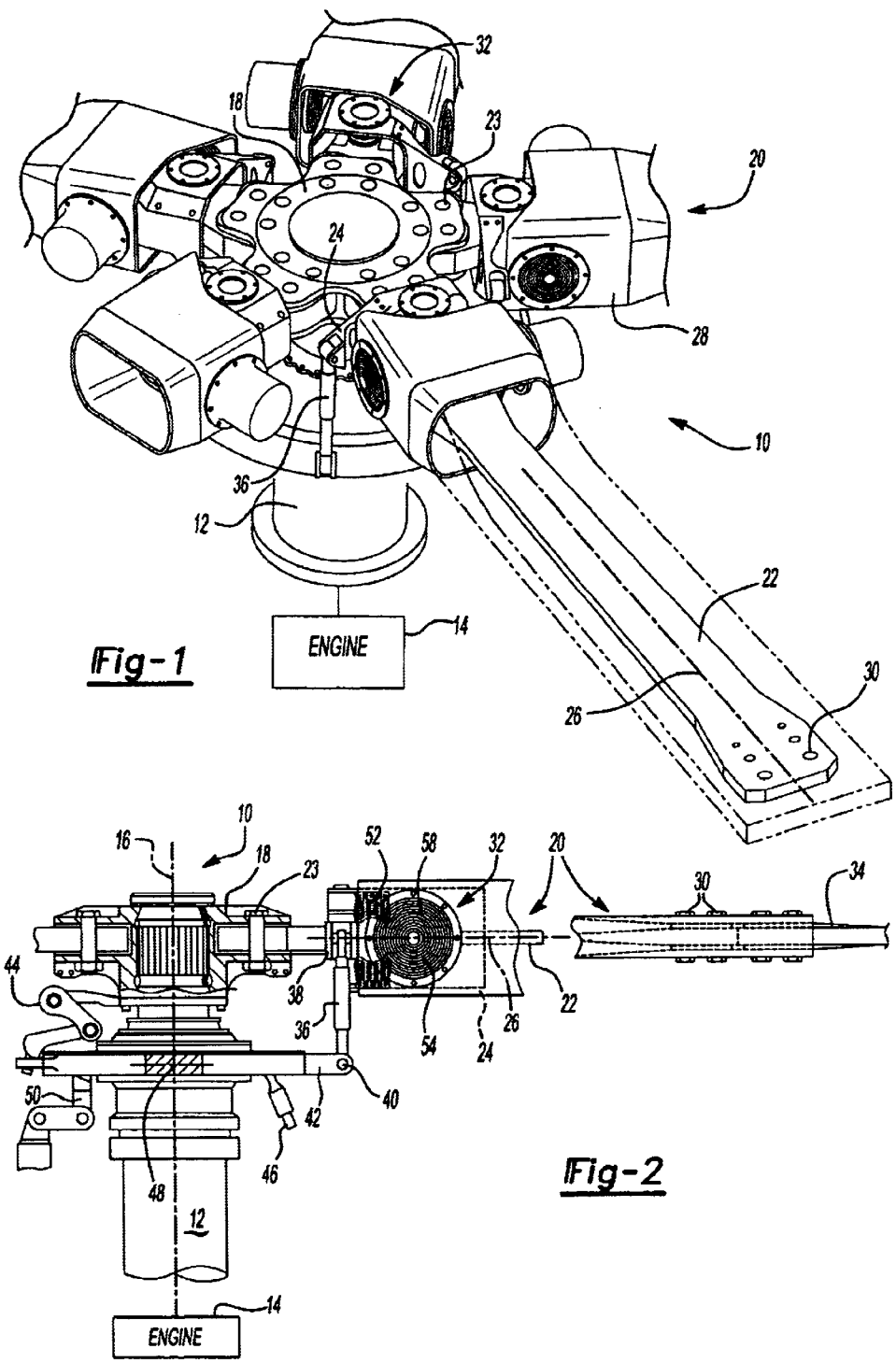

SNUBBER-VIBRATION DAMPER SYSTEM FOR A BEARINGLESS MAIN ROTOR

BACKGROUND OF THE INVENTION

The present invention relates to a bearingless rotor system, and more particularly to a torque tube and intermediate tube blade mounting arrangement which separates the motion accommodating functions of an elastomeric snubber bearing and lead/lag bearing.

Bearingless or "flexbeam" rotor systems require resilient load carrying members between the flexbeam and its surrounding torque tube. The load carrying members position the flexbeam and the attached rotor blade spar for pitch change, flapping and lead/lag motion about the intersection of the pitch change and flapping axes.

The load carrying members are typically elastomeric bearings known as snubber/dampers which include vertically stacked arrangements of spherical and flat elastomeric laminates to center the torque tube about the flexbeam while allowing flapping, pitch and lead/lag motions. The flat layers are stacked to produce a cylindrical cavity to house a damper. The spherical bearing "snubber" accommodates pitch change and flapping rotation (as well as a small amount of lead/lag rotation) while the flat layers accommodate lead/lag linear motions and some radial(spanwise)motion.

The snubber/dampers are located between the flexbeam spar and the torque tube under a preload so that the elastomer laminates thereof remain in compression throughout the full range of articulation as the elastomeric laminates may fail under tension. The snubber/dampers are commonly mounted through a clearance opening in the torque tube and attached through an opening in the flexbeam spar. The snubber/dampers are axially preloaded by a shimming procedure. Preloading reduces the free height of the elastomeric stack while pre-stressing the torque tube. Although highly effective, difficulties arise with conventional bearingless rotor systems.

Firstly, as the blade lead/lags, the preload leads/lags which generates high bending load moments. The bending load moments may overcome the compressive preload and produce tension in the elastomeric bearing arrangement. Tension is detrimental to elastomeric laminates as tension operates to delaminate the elastomeric bearing arrangement. As lead/lag motion increases, the preload is further reduced which thereby further compounds this effect.

Secondly, the vertically stacked elastomeric bearing arrangement may in some circumstances provide poor damping. The cylindrical damper cavity cannot be easily separated into two separate chambers which would allow orifice/piston type damping as the cavity changes shape as the elastomer deforms to accommodate lead/lag motion. A typical arrangement requires two dampers (one above the flexbeam and one below) to provide symmetry and compensate for inefficiencies. Moreover, the vertically stacked structure is complex and highly stressed which results in relatively low fatigue life.

Thirdly, a pitch horn is typically attached to the torque tube to receive control inputs from a swashplate. The elastomeric bearing transfers pitch inputs and rotor flap shear in the torque tube to the flexbeam. Because the pitch horn is mounted to the torque tube, the horn radius (the distance between the pitch input and the rotor feathering axis) changes as the blade lead/lags. This may produce unstable pitch/lag coupling effects as well as undesirable control system vibration.

Lastly, consideration must also be provided for the size of the elastomeric bearing in relation to the accommodation of loads and motions involved in flight as designs which meet desired flight envelope capabilities may not be readily contained within the torque tube. Simply increasing the torque tube size would undesirably increase rotor system weight and drag.

Accordingly, it is desirable to provide a bearingless rotor system which overcomes these difficulties while improving the fatigue life of the elastomeric bearings.

SUMMARY OF THE INVENTION

The flexbeam rotor system according to the present invention provides a series of rotor blade assemblies each of which has a snubber-vibration damper system. Each blade assembly includes a flexbeam integrally connected to the rotor hub. An intermediate tube and a torque tube envelope the flexbeam in spaced relation thereto. The torque tube is connected to the flexbeam at its radially outer end and articulately connected to the intermediate tube through the snubber-vibration damper system. The torque tube is connected or integral to an aerodynamic rotor blade member.

The snubber vibration damper system includes a snubber bearing and a lead/lag bearing. The snubber bearing includes spherical bearing elements and cylindrical bearing elements. The cylindrical bearing elements are not flat, but are axisymmetric shells defined about the pitch axis to accommodate some of the pitch motion and all of the spanwise linear motion. The snubber bearing is located between the flexbeam and the intermediate tube along a pitch change axis. The torque tube is mounted for lead/lag motion relative to the intermediate tube through the lead/lag bearing. Pitch motion is directly transferred from the intermediate tube to the torque tube.

Each lead/lag bearing includes a cylindrical elastomeric bearing mounted about a mount which is rigidly attached to the intermediate tube. The lead/lag bearing is located independent of the snubber bearing. The inner diameter of the cylindrical elastomeric bearing is attached to the mount and the outer diameter is attached to the torque tube. Lead/lag motion between the torque tube and the flexbeam is thereby accommodated by the lead/lag bearing independent of the snubber bearing.

A lead/lag bearing is mounted on both the leading and trailing portion of blade assembly to provide a chord wise-distance therebetween. The offset between the leading and trailing lead/lag bearing defines an axis which is parallel to an axis defined between the center of the snubber bearing and a point which defines the center of the pitch horn. By locating the axes in parallel, a purely vertical pitch/flap force coupling results.

The leading edge damper is positioned outboard of the snubber. Damper force will produce an inplane moment about the snubber, which is reacted by spanwise forces in the cylindrical lead/lag bearings. Also, pitch inputs produce a torsional moment which are reacted by vertical forces in the lead/lag bearings. The high chordwise distance between the lead/lag bearings reduces both the spanwise forces and the vertical forces. A damper such as multi-chamber fluid damper is mounted to the leading lead/lag bearing along the leading mount. The trailing lead/lag bearing is longitudinal offset from the leading lead/lag bearing.

The pitch horn is mounted to the intermediate tube inboard of the snubber bearing. By mounting the pitch horn inboard of the snubber bearing, a desirable pitch/flap coupling (delta-3) is achieved.

Pitch/lag coupling complications are also minimized as lead/lag motion takes place between the torque tube and the intermediate tube. Unstable pitch/lag coupling effects and undesirable control system vibrations are greatly reduced. Moreover, control loads and control displacement requirements are reduced as pitch inputs are more directly communicated through the intermediate tube.

The snubber bearing includes spherical bearing elements and cylindrical bearing elements. The cylindrical bearing elements need only accommodate minimal spanwise motion of the torque tube relative the flexbeam. This motion is relatively minor in comparison to lead/lag motion. As lead/lag motion is accommodated in the independent lead/lag bearing, the snubber bearing is of a greatly reduced height in relation to conventional design. The overall size of the torque tube is accordingly reduced which advantageously reduces system weight and drag.

The intermediate tube preloads the snubber bearing independently. That is, the preload force does not lead/lag with the torque tube. It is therefore relatively less difficult to maintain the snubber bearing in compression throughout the full range of articulation. The spherical bearing elements have reduced bending load movement, less possibility of being subjected to tension and an improved fatigue life. Further, because the snubber bearing is subjected to reduced bending loads due to lead/lag, mounting is simplified.

The present invention therefore overcomes difficulties associated with conventional bearingless rotor system while improving the fatigue life of the elastomeric bearings.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general perspective view a flexbeam rotor system having a snubber-vibration damper system according to the present invention;

FIG. 2 is a side view of a rotor blade assembly of the flexbeam rotor system;

DETAILED DESCRIPTION OF THE PREFERRED EMBODIMENT

Figure 3:
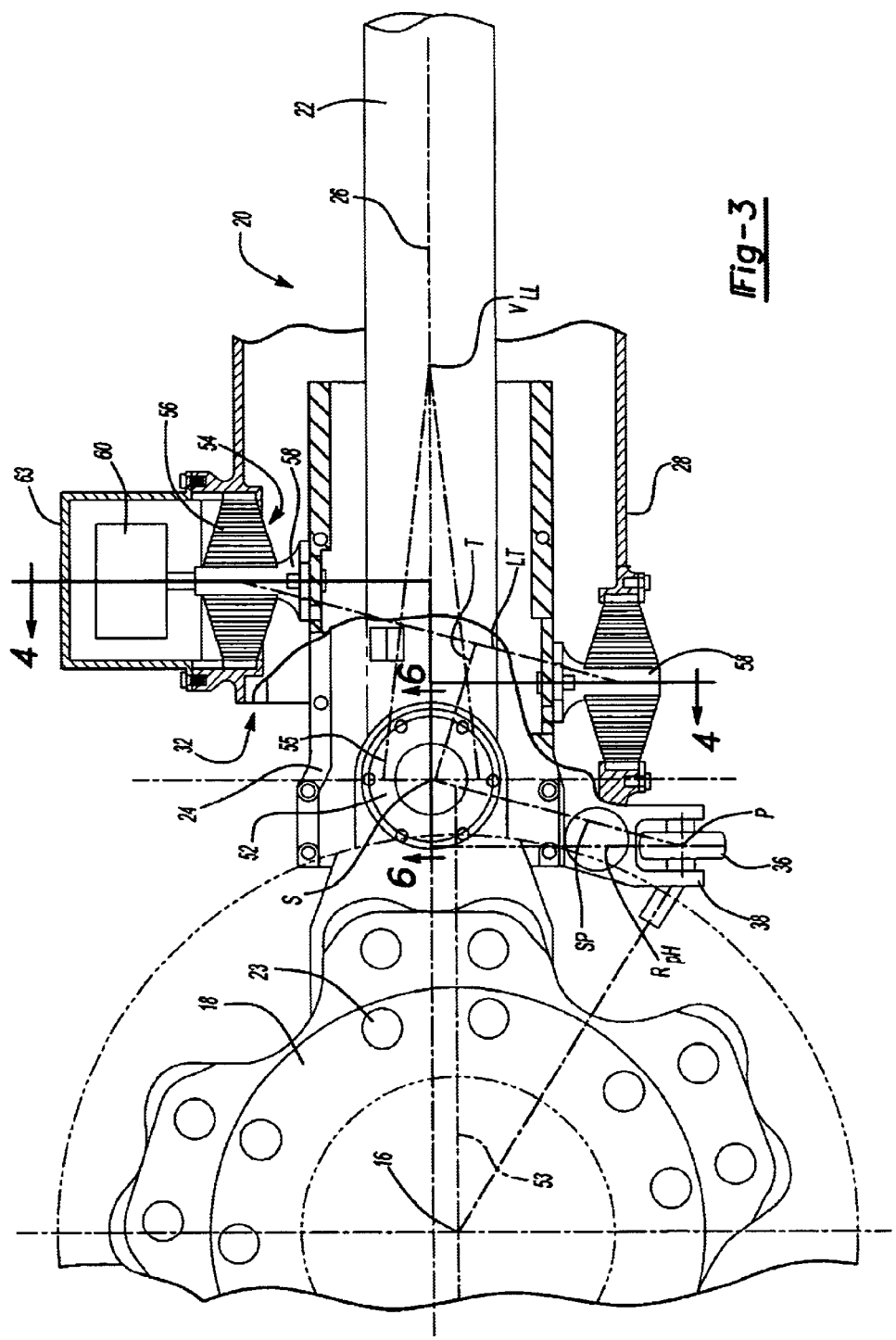
FIG. 3 is a top view of a rotor blade assembly of the flexbeam rotor system.

FIG. 1 illustrates a general perspective view of a flexbeam rotor system 10 which includes a drive shaft 12 which is driven in conventional fashion by an engine 14, typically through reduction gearing (not shown), for rotation about an axis of rotation 16. A rotor hub 18 is mounted on the drive shaft 12 for rotation therewith about axis 16, and supports therefrom a series of blade assemblies 20. It should be understood that although a particular rotor system 10 is illustrated in the disclosed embodiment, other main and tail rotor systems will benefit from the present invention.

Each blade assembly 20 includes a flexbeam 22 integrally connected to the rotor hub 18 by fasteners 23 so as to be flexible about a pitch change axis 26. Other attachment devices and methods will also benefit from the present invention. An intermediate tube 24 and a torque tube 28 envelopes flexbeam 22 in spaced relation thereto. The torque tube 28 is connected to the flexbeam 22 at its radially outer end by connecting fasteners 30 and is articulately connected thereto through the intermediate tube 24 and snubber-vibration damper system 32. Torque tube 28 is connected or preferably integral with an aerodynamic rotor blade member 34. It should be understood that although the description will make reference to but a single blade assembly 20, such description is applicable to each blade assembly 20.

Referring to FIG. 2, pitch change loads are imparted to each blade assembly 20 by pitch control rods 36 which are articulatably connected at one end to the outer periphery of the intermediate tube 24 at a pitch horn 38. The opposite end of the pitch control rod 36 is articulately connected to a swashplate 42. The swashplate 42 is connected by a scissors arrangement 44 to the rotor hub 18 for rotation therewith. The swashplate 42 receives control inputs from control rods 46 and control rods 50.

Pitch control commands imparted by swashplate control rods 46 cause tilting of swashplate 42 about point 48. Tilting of the swashplate 42 imparts pitch change loads to the intermediate tube 24 through pitch control rod 36. Pitch change loads to the intermediate tube 24 are imparted to the torque tube 28 and flexbeam 22 through the snubber-vibration damper system 32. Interaction of the snubber-vibration damper system 32 with the torque tube 28 causes the torque tube 28, flexbeam 22 and blade member 34 to pitch about pitch change axis 26. Inputs from control rods 50 cause the swashplate 42 to axially translate along axis of rotation 16 to impart pitch control loads to the intermediate tube 28 and, hence, blade member 34. When swashplate 42 translates along axis 16, it imparts collective pitch change to blade assemblies 20, and when it tilts about point 48, it imparts cyclic pitch change.

Referring to FIG. 3, a top view of the blade assembly 20 is illustrated. Each blade assembly 20 includes the snubber vibration damper system 32. The snubber vibration damper system 32 includes a snubber bearing 52 and a lead/lag bearing 54. The lead/lag bearing 54 is located independent of the snubber bearing 52. The snubber bearing 52 is located between the flexbeam 22 and the intermediate tube 24. Preferably, a removable preload cap 55 (FIG. 5) attached to the intermediate tube 24 provides access and preload to the snubber bearing 52. The torque tube 28 is mounted for lead/lag motion relative to the intermediate tube 24 through the lead/lag bearing 54. Pitch motion, however, is directly transferred from the intermediate tube 24 to the torque tube 28. That is pitch input to the intermediate tube 24 is mechanically transferred (FIG. 4) to the torque tube 28.

The snubber bearing 52 is located along the pitch change axis 26 at point S. The pitch change axis 26 is offset from the axis of rotation 16. Preferably, the pitch change axis 26 is parallel to and forward of a longitudinal axis 53 which intersects the axis of rotation 16. It should be understood that other orientations will also benefit from the present invention.

Each lead/lag bearing 54 includes a cylindrical elastomeric bearing 56 mounted about a mount 58. Mount 58 is preferably of a rod-like confirmation which is rigidly mounted to the intermediate tube 24. The mount 58 extends from the intermediate tube 24 to support the cylindrical elastomeric bearing 56. The inner diameter of the cylindrical elastomeric bearing 56 is attached to the mount 58. The outer diameter of the cylindrical elastomeric bearing 56 is attached to the torque tube 28 (also illustrated in FIG. 4). A ring 59 (FIG. 5) preferably removably mounts the cylindrical elastomeric bearing 56 to the torque tube 28 through fasteners 61 to provide for maintenance and the like. Preferably, the inner diameter of the cylindrical elastomeric bearing 56 is axially thicker than the outer diameter of the cylindrical elastomeric bearing 56. Lead/lag motion between the torque tube 28 and the flexbeam 22 is thereby accommodated by the lead/lag bearing 54 independent of the snubber bearing 52.

Preferably, the lead/lag bearing 54 is mounted on both the leading and trailing portion of blade assembly 20 to provide a relatively large chord wise-distance therebetween. Lead/lag motion of the blade assembly 20 occurs about a virtual lead/lag hinge point $V_{LL}$. The spherical/cylindrical snubber bearing 52 preferably does not accommodate lead/lag motion, but does provide the reaction of the damper load to the flexbeam/ground. Because the leading edge damper is positioned outboard of the snubber bearing 52 applied force will produce an inplane moment about the snubber bearing 52 which is reacted by spanwise(radial) forces in the cylindrical lead/lag bearings 54. Also, pitch inputs produce a torsional moment about axis T (FIG. 3) which are reacted by vertical forces in the lead/lag bearings 54. The high chordwise distance between the lead/lag bearings reduces both the spanwise (radial) forces and the vertical forces. Any radial forces upon the snubber bearing 52 due to lead/lag motion are therefore relatively small.

A damper (illustrated schematically at 60) such as multi-chamber fluid damper is preferably mounted to the leading lead/lag bearing 54 along the leading cylindrical mount 58 within a housing 63. The damper reacts against lead/lag motions of the blade assembly 20. Cylindrical elastomeric bearing 56 also serves as a vibration damper in combination with the damper 60. It should be understood that multiple dampers (leading and trailing) and other damper arrangements will also benefit from the present invention.

The trailing lead/lag bearing 58 is longitudinal offset from the leading lead/lag bearing 58. The trailing lead/lag bearing 58 is longitudinally outboard of the pitch horn 38. The leading lead/lag bearing 54 is longitudinally outboard of the trailing lead/lag bearing 58. Clearance for the adjacent blade assembly 20 pitch linkage is thereby assured. The offset between the leading and trailing lead/lag bearings 54, 58 defines an axis LT. Preferably, axis LT is parallel to an axis SP defined between the center S of the snubber bearing 52 and a point P which defines the point where the pitch control rod 36 is centered within the pitch horn 38. By locating the axes LT and SP in parallel, a purely vertical pitch/flap force coupling results. That is, an axis T including point S and being perpendicular to axis LT and SP will be in pure torsion when the blade flaps.

Figure 4:
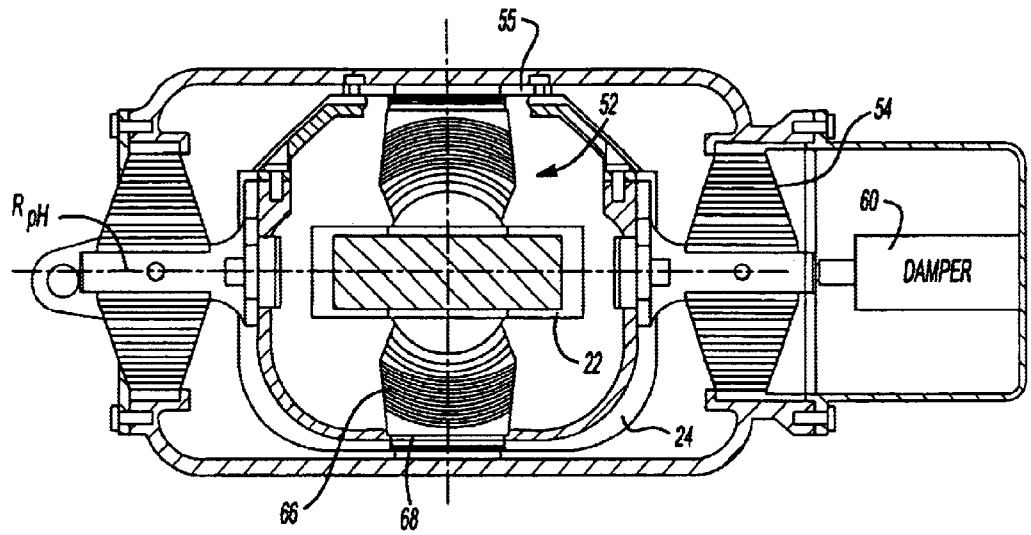
FIG. 4 is a sectional view of the rotor blade of FIG. 3 taken along the line 4—4.
Figure 5:
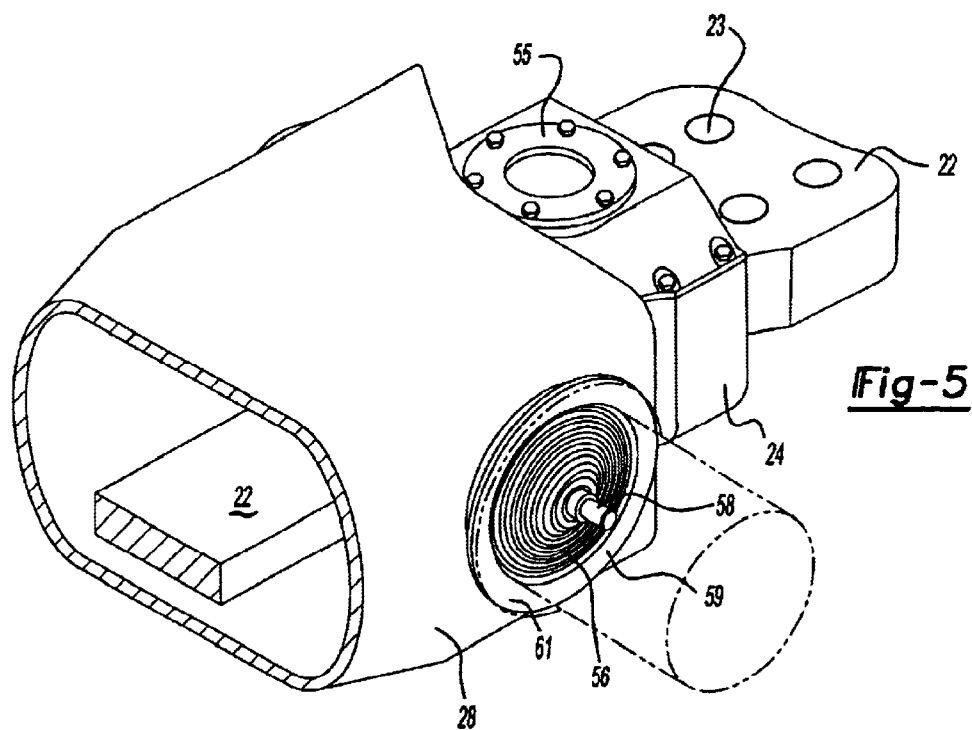
FIG. 5 is a general perspective view of the torque tube.

The pitch horn 38 is mounted directly to the intermediate tube 24 inboard of the snubber bearing 52 and defines a horn radius Rph (the distance between the pitch input and the rotor feathering axis; FIG. 4). By mounting the pitch horn 38 inboard of the snubber bearing 52, desired pitch/flap coupling (delta-3) is achieved. Preferably, as the blade assembly 20 flaps up, the pitch/flap coupling assures a slight decrease in pitch.

The present invention also minimizes pitch/lag coupling complications as lead/lag motion takes place between the torque tube 28 and the intermediate tube 24. The intermediate tube 24 and thus the pitch horn 38 are essentially isolated in the lead/lag direction. That is, because the pitch horn 38 is mounted to the intermediate tube 24, the horn radius Rph does change the blade lead/lags. Unstable pitch/lag coupling effects and undesirable control system vibrations are greatly reduced. Moreover, control loads and control displacement requirements are reduced as pitch inputs are more directly communicated through the intermediate tube 24.

Figure 6:
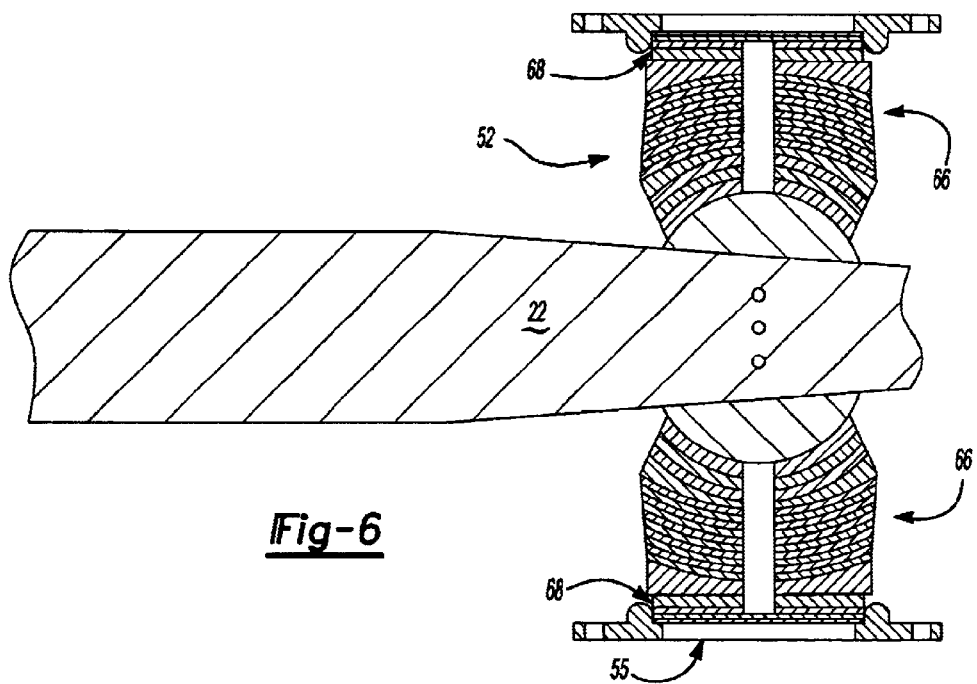
FIG. 6 is a sectional view of the rotor blade of FIG. 3 taken along the line 6—6.

Referring to FIG. 4, the snubber bearing 52 includes spherical bearing elements 66 and cylindrical bearing elements 68 (also illustrated separately in FIG. 6). The cylindrical bearing elements 68 are not flat, but are axisymmetric shells defined about the pitch axis to accommodate some of the pitch motion and all of the spanwise linear motion. The spherical bearing elements 66 accommodate the flapping motion. Both the spherical bearing elements 66 and the cylindrical bearing elements 68 resist lead/lag motion. The snubber bearing 52 need only accommodate minimal flapping and spanwise motion of the torque tube 28 relative the flexbeam 22. This motion is relatively minor in comparison to lead/lag motion.

As lead/lag motion is accommodated in the independent lead/lag bearing 54, the snubber bearing 52 is of a greatly reduced height in relation to conventional design. The overall size of the torque tube 28 is accordingly reduced which advantageously reduces system weight and drag. Conventional practice would otherwise require a larger torque tube to contain and preload the more numerous flat elastomer elements which results in a taller snubber bearing. The flat elastomeric layers that previously accommodated lead/lag motions are not required and the cylindrical bearing elements 68 according to the present invention accommodate spanwise motion (which the prior art flat layers used to do) also carry pitch motion, so they may replace some of the spherical bearing elements 66.

The intermediate tube 24 independently preloads the snubber bearing 52. That is, the preload force does not lead/lag with the torque tube 28. It is therefore relatively less difficult to maintain the snubber bearing 52 in compression throughout the full range of articulation. The spherical bearing elements 66 will have reduced bending load movement, less possibility of being subjected to tension and an improved fatigue life. Further, because the snubber bearing 52 is subjected to minimal bending loads due to lead/lag, mounting is simplified. That is, the flexbeam 2-2- may be a solid cross-section as flexbeam attachment openings are no longer required to assure positive retention against the high bending load moments.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A snubber-vibration damper system for a rotor blade assembly comprising:

a flexbeam defining a pitch change axis;

an intermediate tube at least partially surrounding said flexbeam;

a torque tube at least partially surrounding said intermediate tube;

a snubber bearing mounted to said flexbeam and said intermediate tube along said pitch change axis; and a lead/lag bearing mounted to said intermediate tube and said torque tube.

2. The snubber-vibration damper system as recited in claim 1, wherein said snubber bearing comprises a plurality of spherical bearing elements and a plurality of cylindrical bearing elements.

3. The snubber-vibration damper system as recited in claim 2, wherein said plurality of spherical bearing elements define a first height greater than a second height defined by said cylindrical bearing elements.

4. The snubber-vibration damper system as recited in claim 1, further comprising a mount extending from said intermediate tube, said lead/lag bearing mounted to said mount.

5. The snubber-vibration damper system as recited in claim 4, wherein said mount extends substantially perpendicular to said pitch change axis.

6. The snubber-vibration damper system as recited in claim 4, further comprising a damper mounted to said mount.

7. The snubber-vibration damper system as recited in claim 4, wherein said lead/lag bearing comprises an annular member, an inner diameter of said lead/lag bearing mounted to said mount.

8. The snubber-vibration damper system as recited in claim 1, wherein said snubber bearing comprises a plurality of axisymmetric shells defined along said pitch change axis.

9. The snubber-vibration damper system as recited in claim 1, further comprising a pitch horn extending from said intermediate tube.

10. The snubber-vibration damper system as recited in claim 9, wherein said pitch horn is longitudinally inboard of said lead/lag bearing, said pitch horn and a mount attached to said lead/lag bearing located within a common plane.

11. The snubber-vibration damper system as recited in claim 1, further comprising a rotor blade member extending from said torque tube.

12. The snubber-vibration damper system as recited in claim 11, wherein said flexbeam is mounted to a rotor hub and said rotor blade member.

13. A snubber-vibration damper system for a rotor blade assembly comprising:

a flexbeam defining a pitch change axis;

an intermediate tube at least partially surrounding said flexbeam;

a torque tube at least partially surrounding said intermediate tube;

a rotor blade member extending from said torque tube;

a snubber bearing mounted to said flexbeam and said intermediate tube along said pitch change axis;

a leading lead/lag bearing mounted to said intermediate tube and said torque tube; and a trailing lead/lag bearing mounted to said intermediate tube and said torque tube.

14. The snubber-vibration damper system as recited in claim 13 wherein said snubber bearing comprises a plurality of spherical bearing elements and a plurality of cylindrical bearing elements, said plurality of spherical bearing elements define a first height greater than a second height defined by said plurality of cylindrical bearing elements.

15. The snubber-vibration damper system as recited in claim 13, wherein said leading lead/lag bearing is longitudinally offset from said trailing lead/lag bearing.

16. The snubber-vibration damper system as recited in claim 13, wherein said leading lead/lag bearing is longitudinally outboard of said trailing lead/lag bearing.

17. The snubber-vibration damper system as recited in claim 13, further comprising a leading mount and a trailing mount extending from said intermediate tube to respectively mount said leading lead/lag and said trailing lead/lag bearing, said leading mount and said trailing mount mounted within a common plane.

18. The snubber-vibration damper system as recited in claim 13, wherein a first axis is defined between a center of said leading lead/lag bearing and a center of said trailing lead/lag bearing, and a second axis is defined between a center of said snubber bearing and a center of a pitch horn, said first axis parallel to said second axis.

19. The snubber-vibration damper system as recited in claim 18, wherein said pitch horn is longitudinally inboard of said trailing lead/lag bearing.

20. The snubber-vibration damper system as recited in claim 13, further comprising a damper mounted to said leading lead/lag bearing.

21. The snubber-vibration damper system as recited in claim 13 wherein said snubber bearing is preloaded by said intermediate torque tube.

22. The snubber-vibration damper system as recited in claim 13 wherein said snubber bearing is mounted to an outer surface of said flexbeam.

23. The snubber-vibration damper system as recited in claim 13, wherein said snubber bearing comprises a plurality of axisymmetric shells defined along said pitch change axis.

24. The snubber-vibration damper system as recited in claim 13, further comprising a leading mount and a trailing mount extending from said intermediate tube to respectively mount said leading lead/lag and said trailing lead/lag bearing, said leading mount and said trailing mount mounted extending substantially perpendicular to said pitch change axis.

25. The snubber-vibration damper system as recited in claim 13, wherein said leading lead/lag bearing and said trailing lead/lag bearing comprise an annular member.

* * * * *